United States Patent [19]

Robota

[11] 3,859,372

[45] Jan. 7, 1975

[54] PROCESS FOR THE PREPARATION OF ORGANIC FLUORINE COMPOUNDS

[75] Inventor: Stephen Robota, North Tonawanda, N.Y.

[73] Assignee: Hooker Chemical Corporation, Niagara Falls, N.Y.

[22] Filed: Aug. 30, 1972

[21] Appl. No.: 284,786

Related U.S. Application Data

[63] Continuation-in-part of Ser. No. 881,912, Dec. 3, 1969, abandoned, which is a continuation-in-part of Ser. No. 809,474, March 17, 1969, abandoned, which is a continuation of Ser. No. 476,673, Aug. 2, 1965, abandoned, Continuation-in-part of Ser. No. 384,518, July 22, 1964, abandoned.

[52] U.S. Cl............................. 260/651 F, 252/442
[51] Int. Cl............................................. C07c 25/00
[58] Field of Search........... 260/651 F, 653 F, 653.4, 260/653

[56] References Cited

UNITED STATES PATENTS

| 2,005,712 | 6/1935 | Holt | 260/651 F |
| 2,744,148 | 5/1956 | Ruh et al. | 260/653 F |
| 2,946,828 | 2/1960 | Scherer et al. | 260/653 F |
| 3,183,276 | 5/1965 | Vecchio | 252/442 X |
| 3,258,500 | 1/1966 | Swamer et al. | 260/651 F X |
| 3,294,852 | 12/1966 | Vecchio et al. | 260/653 F |

FOREIGN PATENTS OR APPLICATIONS

| 1,116,658 | 6/1968 | Great Britain | 260/653.5 |
| 575,593 | 5/1933 | Germany | 260/651 F |

Primary Examiner—Leon Zitver
Assistant Examiner—James H. Reamer
Attorney, Agent, or Firm—Peter F. Casella; Donald C. Studley; William J. Crossetta, Jr.

[57] ABSTRACT

A process for the production of compounds of the formula

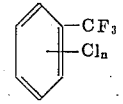

which comprises
1. contacting in the liquid phase HF with a compound of the formula

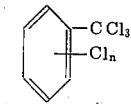

2. feeding the aromatic product of step (1) to a second reactor, and
3. contacting in the vapor phase HF with the product of step (2)

wherein steps (1) and (3) are performed in the presence of a co-precipitated metal-aluminum-fluoride complex wherein the metal is selected from the group consisting of Group IB, IIB, VIB and VIII of the Periodic Table of Elements and $n$ is from 0 to 5, inclusive.

7 Claims, No Drawings

PROCESS FOR THE PREPARATION OF ORGANIC FLUORINE COMPOUNDS

This is a continuation-in-part of application Ser. No. 881,912, filed Dec. 3, 1969, now abandoned which was a continuation-in-part of Ser. No. 809,474, filed Mar. 17, 1969, now abandoned, which was a streamline continuation of Ser. No. 476,673, filed Aug. 2, 1965, now abandoned. The latter application was a continuation-in-part of Ser. No. 384,518 filed July 22, 1964, abandoned.

The present invention relates to a process for the preparation of organic fluorine compounds. More specifically, it relates to a process for the replacement of halogen atoms with fluorine in organic compounds.

Processes are known in which fluorine replaces substituents of organic compounds, such as halogens, hydrogen atoms, and the like. Many of these processes are unsuitable for commercial use because of the low purity of product obtained, as well as the high cost of equipment which must be utilized. Nearly all the present industrial fluorination processes employ an organic halide, hydrogen fluoride, and sometimes a catalyst, in a liquid phase and under high pressure. These methods, however, may require high pressures, substantially consume metal halide catalysts, have slow reaction rates, and often result in low yields and low purities of products. Vapor phase fluorination reactions are known wherein a catalyst of activated carbon impregnated with metal halides is employed. Such processes, however, are not as useful as the process of the present invention, because in them the catalyst life may be very short and, consequently, the catalyst has to be replaced frequently, due to the loss of metal halide.

Accordingly, it is an object of the present invention to provide a novel process for the fluorination of halogenated organic compounds. It is a further object of this invention to provide a process for the preparation of fluorinated organic compounds in good yields and high purities, at rapid reaction rates. Another object of this invention is in the provision of a catalyst of increased activity and longer effective life. These and other objects will appear hereinafter.

In accordance with this invention, there is provided a novel process for the preparation of fluorinated aromatic compounds which comprises contacting and reacting a halogenated aromatic compound, wherein the halogen is other than fluorine, with a fluorinating agent in the presence of a novel fluorinated metal-alumina catalyst. The halogenated aromatic compound reactant may contain stable substituents, such as halogen, alkyl, alkoxy, substituted alkyl, and the like, or any other substituents which will not adversely affect the reaction.

In one embodiment of this invention, a fluorinated aromatic compound of the formula:

is prepared by contacting and reacting a halogenated aromatic compound of the formula:

with a fluorinating agent, in the presence of a novel complex fluorinated metal-alumina catalyst, wherein Ar is aryl; R is a substituent on the aryl nucleus and is selected from the group consisting of aryl, substituted aryl, halogen, alkyl, alkoxy and substituted alkyl; $n$ is the number of R substituents on the aryl nucleus, the maximum value of $n - Z$ being equal to the total number of positions available on the aryl nucleus; X is a halogen atom other than fluorine and $y$ is from 0 to 2.

In certain instances, such as when $y$ is 2, i.e., the reactant contains only one replaceable halogen, the resulting monofluoride may be either unstable or reactive and polymers or decomposition products may result. By suitable adjustment of reactant proportions and retention time in the catalyst bed, it is possible to prepare compounds such as

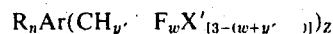

wherein $y'$ is from 0 to 1, $w$ is from 1 to 2, $X'$ is a halogen atom other than fluorine, R, $n$, Ar, and Z being as defined herein, subject to the provision that the total number of valences on the carbon atom bonded to the aromatic nucleus Ar, is equal to 4, comprising contacting or reacting a compound of the formula

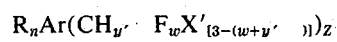

with a fluorinating agent in the presence of a complex co-precipitated metal-alumina catalyst as described herein.

Another embodiment of the present invention is concerned with the preparation of a fluorinated aromatic compound selected from the group consisting of

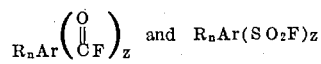

which comprises contacting and reacting a halogenated aromatic compound selected from the group consisting of

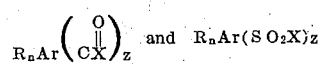

with a fluorinating agent as described herein, wherein the substituents R, $n$, Ar, Z, and X are as defined herein.

Also included within the scope of the present invention is the preparation of fluorinated aromatic compounds of the formula

which comprises contacting and reacting a halogenated aromatic compound of the formula

with a fluorinating agent in the presence of a complex fluorinated metal-alumina catalyst, wherein the substituents R, $n$, Ar, X, and Z are as defined hereinbefore.

Among the R radicals encompassed herein are alkyl hydrogen of from 1 to about 20 carbon atoms, and preferably of from 1 to about 12 carbon atoms, such as methyl, ethyl, propyl, butyl, amyl, octyl, decyl, dodecyl, pentadecyl, eicosyl, as well as their various isomer forms, such as isopropyl and isobutyl, said alkyl radical being a monovalent radical derivable from an aliphatic hydrocarbon alkane by the removal of 1 hydrogen atom; substituted alkyl of from 1 to about 30 carbon atoms and preferably of from 1 to about 15 carbon atoms, said alkyl group being substituted by one or more of halogen, aryl, substituted aryl, and the like, alkoxy of from 1 to about 20 carbon atoms, and preferably of from 1 to about 12 carbon atoms, such as methoxy, ethoxy, propoxy, butoxy, pentoxy, octoxy, decoxy, dodecoxy, pentadecoxy, eicosoxy, as well as their various isomer forms, such as iso-propoxy, iso-butoxy, and the like; and, halogen being chlorine, bromine, or iodine. Of course, different R's and substituted R's may be employed in the halogenated aromatic compound reactants and corresponding products will be obtained.

The designations Ar or aryl represents an aromatic structure containing from 6 to about 18 carbon atoms and preferably 6 to about 10 carbon atoms, such as benzene, naphthalene, anthracene, and the like.

The symbol $n$ represents the number of R substituents on the aromatic nucleus. Generally, $n$ is from 0 to about 10 and preferably it is from 1 to about 5. The symbol Z represents the number of $CH_yF_{3-y}$, F, X, $CH_yX_{3-y'}$, $CH_{y'}F_wX'_{[3-(w+y')]}$, $CH_yX'_{[3-(w+y')]}$, $SO_2F$ and $SO_2X$ substituents on the aromatic nucleus and, generally, it is from 1 to about 10, the maximum value of $n + Z$ being equal to the total number of positions available on the aromatic nucleus. Thus, when Ar is benzene, if the value of $n$ is 3, the maximum value of Z will be 3.

A preferred reaction scheme is the fluorination of compounds of the formula

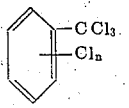

wherein $n$ is from 0 to 5, inclusive employing the novel catalyst as described herein. The reaction sequence is to partly fluorinate the side chain ($-CCl_3$) by substituting F for Cl. This is performed in two steps:

1. contacting a benzotrichloride compound with HF in a reactor in the liquid phase and
2. feeding the product of step (1) to a second reactor
3. contacting the product of step (2) with HF in the vapor state.

Steps (1) and (3) are performed in the presence of the catalyst described herein. The particular advantage of the above sequence is that the same type of catalyst can be employed in both liquid and vapor phase fluorinations. This is because the complex co-precipitated catalyst is homogenous. Impregnated catalysts are not equally useful in both states. The complex co-precipitated catalysts are equally useful in both states. The complex co-precipitated catalyst can be used in the liquid state with particle size being mostly in the range from −20 to 230 mesh. Particle size should be such as to remain in suspension in the organic media. In the vapor state, for a fixed bed reactor a typical particle size is such that about 99 percent is retained on +8 U.S. sieve. This catalyst when ground can also be used effectively in a fluidized bed. Particle size for vapor state reactions generally range between about 1/16 to about ½ inch in diameter.

The purpose of combining liquid and vapor state reactions is to utilize fully the HF. Therefore any gas containing HF may be employed in step (1) above. It is preferred that the ratio of reactants for step (1) range from about 0.1:1.0 to 3.0:1, HF : aromatic compound.

A preferred range is about 1:1. Since HCl is a byproduct from the vapor phase reaction, the off-gas can be used in the liquid phase reaction. However, the criteria for the reaction is the amount of HF. The ratio in step (3) is from stoichiometric to about 6.0:1.0; Hf : aromatic compound. A preferred ratio in step (3) is from about 2.0:4.0; HF : aromatic compound.

The temperature range for the liquid phase reaction is from about 0 degrees centigrade to reflux temperature, preferable 40 degrees centigrade-150 degrees centigrade. The temperature range for the vapor phase reaction is from about 200 degrees centigrade to about 500 degrees centigrade, preferably about 250 degrees centigrade to about 450 degrees centigrade.

The preferred catalyst employed in the process of the present invention can best be described as a complex co-precipitated copper-alumina catalyst which has been fluorinated, either prior to the main reaction or during the main reaction with a fluorinating agent, as disclosed herein. In place of or in addition to the copper, one or more metals of groups 3–8 of the periodic table which possess variable valences, can be an ingredient of the catalyst.

In view of the fact that the invention pertains to the several metals of Group IB, IIB, VIB and VIII of the Periodic Chart of the Elements as listed in *Lange's Handbook of Chemistry*, Eighth Edition, Pages 56–57, these metals, including copper, silver, gold, chromium, nickel, cobalt, zinc, cadmium, iron, ruthenium, rhodium palladium, etc. for simplification the disclosure and examples will be directed more particularly to copper, cobalt, copper-cobalt, iron and chromium. However, it is to be understood that when copper is mentioned, equivalent Group IB, IIB, VIB and VIII metals are to be considered included and that in the description of copper, cobalt, etc., all Group IB, IIB, VIB and VIII metals are included. As is used herein, the term "metal" indicates metals of Group IB, IIB, VIB and VIII of the Periodic Chart of Elements as listed in *Lange's Handbook*, Eighth Edition.

The catalysts of the present invention are best described as co-precipitated metal-alumina complexes which have been fluorinated either in a separate step or in which fluorination is effected during the fluorination process in which the metal-aluminum-fluoride complex is formed in the presence of the other reactants and catalyzes their reaction. Therefore, the metal-alumina complex starting material can be fluorinated to a metal-aluminum-fluoride complex by any of several methods, wherein the reaction is effected with the starting material in either a dilute or concentrated condition.

The preferred starting composition for the manufacture of the catalyst is a co-precipitated alumina complex comprised of a major proportion of alumina ($Al_2O_3$) and a lesser, but effective portion of a metal compound complexed therewith. The remainder of the starting composition, if any, is inert materials which may be merely impurities. Generally, the co-precipitated metal-alumina complex starting material is comprised of about 65 per cent to about 99 per cent alumina and a metal compound equivalent to 1 per cent to 35 per cent metal, with the preferred ranges being about 80 per cent to about 90 per cent alumina and about 5 per cent to about 15 per cent metal. Of course, greater and lesser amounts of metal and alumina are also effective and could be used. Thus, in the instance where the co-precipitated starting material is copper-alumina, the complex is comprised of copper, aluminum and oxygen in varying proportions, in a chemically and/or physically combined state, the structural configuration of which is not known with certainty.

The starting material, such as a copper-alumina complex, is prepared by causing an alkaline solution of alumina hydrate and an acid solution of cupric chloride to react in such proportions so as to result in a composition containing about 65 per cent to 99 per cent alumina and from about 1 per cent to 35 per cent by weight of copper, the remainder of the composition, if any, being impurities. After filtering, washing, drying, roasting, crushing and screening, this material is obtained as a granular solid. The particle size may be controlled or selected to suit the intended use. Particles ranging upward from 0.001 to 1.0 inch in diameter are particularly useful in the present process. The particles have a high porosity, large surface area, and, in the case of copper-alumina, they are greenish in color and have a specific gravity greater than one. Through coprecipitation, the copper and alumina are homogeneously distributed throughout the catalyst. These physical attributes are unchanged by fluorination.

As an example of the preparation of the copper-alumina starting material, an aqueous solution of sodium aluminate is co-precipitated by the addition of hydrochloric acid and cupric chloride in a sufficient quantity to precipitate all of the alumina. The precipitated material is filtered, washed with water and dried. In a like manner, metal-alumina complexes of the metals of Groups IB, IIB, VIB and VIII are also produced. It is readily seen that complexes of several metals with alumina are readily made and that complexes of alumina, Group IB, IIB, VIB and VIII metals wherein at least a portion of the Group IB, IIB, VIB and VIII metal is replaced with one or more Group III through Group VII metal may be prepared and used as a starting material. As an example, a complex of alumina and copper can be made wherein at least a portion of the copper and alumina is replaced with a metal of Group III through VIII. Such a complex is made by coprecipitating the metal by mixing hydrochloric acid and aqueous solutions of sodium aluminate, cupric chloride, and other metal chlorides of Group III through VIII metals, such as ferric chloride. The concentration of metal chlorides and sodium aluminate in aqueous solution is regulated so as to produce a complex having the desired proportion of alumina and other metals as previously noted.

The compositions of the present invention are prepared by reacting the roasted metal-alumina complex with hydrogen fluoride. The fluorinated complex results in a material comprising 0.5 to 35 weight per cent metal, 30 to 60 weight per cent aluminum and 25 to 55 weight per cent fluorine. The chemical formulation is not known with certainty, but it is believed to be of the order $x[M(AlF_4)_n] \cdot y[AlF_3]$ where M represents metal as previously described, $x$ equals 1 to 5 and $y$ equals 1 to 10 and $n$ equals 1 to 6, depending on the valence of M.

The preferred method of effecting the fluorination is to contact the metal-alumina complex, such as copper-alumina with hydrogen fluoride gas under controlled temperature conditions. The reaction of hydrogen fluoride with the copper-alumina complex is highly exothermic.

The reaction of hydrogen fluoride with the complex is effected in the temperature range of between 0 degrees centigrade and about 600 degrees centigrade, the lower temperature being that at which it is practicable to attain a suitable reaction rate. The higher limit is that at which metal halides are decomposed or volatilized from the complex. The preferred reaction temperature range for a copper-alumina complex is 70 degrees centigrade to 450 degrees centigrade, using gaseous hydrogen fluoride.

The exothermic reaction is controlled within the desired temperature range by controlling the addition of hydrogen fluoride to the starting material and by the use of an inert diluent gas to aid in the removal of heat and water from the locus of the reaction. Other means of controlling the reaction temperature can be used, such as effecting the hydrofluorination of the starting material in a dilute condition as that obtained by dispersing the starting material in an inert or less reactive material either solid or liquid.

The catalyst, the catalyst diluent, the ratio of reactants and of reactant diluents will vary and depend upon the nature of the reactants employed, as well as on the products desired. Generally, the amount of catalyst to be used is a function of the desired production rate and retention time of the process. Thus, in the present invention as related to vapor phase work, an amount of catalyst, which will give nominal retention times of from 0.5 to about 60 seconds, and preferably of from 5 to about 15 seconds, is employed, resulting in satisfactory performance. Typically, conversions obtained with representative compounds have been as high as 98 per cent and yields have been greater than 90 per cent.

Many of the common fluorinating agents which will result in the desired reaction can be utilized, however, hydrogen fluoride is the preferred fluorinating agent, because of its reactivity and availability.

The reaction can be conducted in either the liquid phase or the vapor phase. Similar conditions are involved in both the vapor and liquid phase reactions. However, the temperatures utilized in said liquid phase reaction normally range from about 0 degrees centigrade to about the temperature at which the reaction mixture decomposes, boils, i.e., about 221 degrees centigrade for benzenetrifluoride, or at which losses of appreciable amounts of metal occur, i.e., up to 500 degrees centigrade with copper. Although a solvent is not used for the liquid phase reaction, one may be utilized if desired to facilitate the reaction. Examples of such solvents include aromatic hydrocarbon solvents like benzene, perfluorinated solvents like perfluorinated alkanes and the like, which solvents may, in some instances, be added as a reactant. It is, of course, appreciated that any solvent that may act in the manner as described herein can be utilized.

The ratio of fluorinating agent to halogenated aromatic compound will depend on the product desired, but generally is from an excess fluorinating agent to a stoichiometric amount. An excess of greater than 100 per cent of the required amount of fluorinating agent is normally employed, and more preferably an excess of up to about 50 per cent. However, if the organic halogenated compound being fluorinated is stable under the fluorination conditions, less than the stoichiometric amount of HF can be used to obtain partially fluorinated compounds.

The pressure and temperature at which the reaction is effected depends upon the characteristics of the reactants, such as the volatility, reactivity, and stability; the temperature normally is in the range of about 200 degrees centigrade to about 500 degrees centigrade and preferably is from about 250 degrees centigrade to about 350 degrees centigrade. Temperatures above 450 degrees centigrade frequently result in shortened catalyst life, but are sometimes useful to secure more complete conversion. Atmospheric pressure is suitable for operation of the process, but operation at super- or sub-atmospheric pressures is in no way excluded.

Illustrative examples of the starting halogenated aromatic reactant include the following:

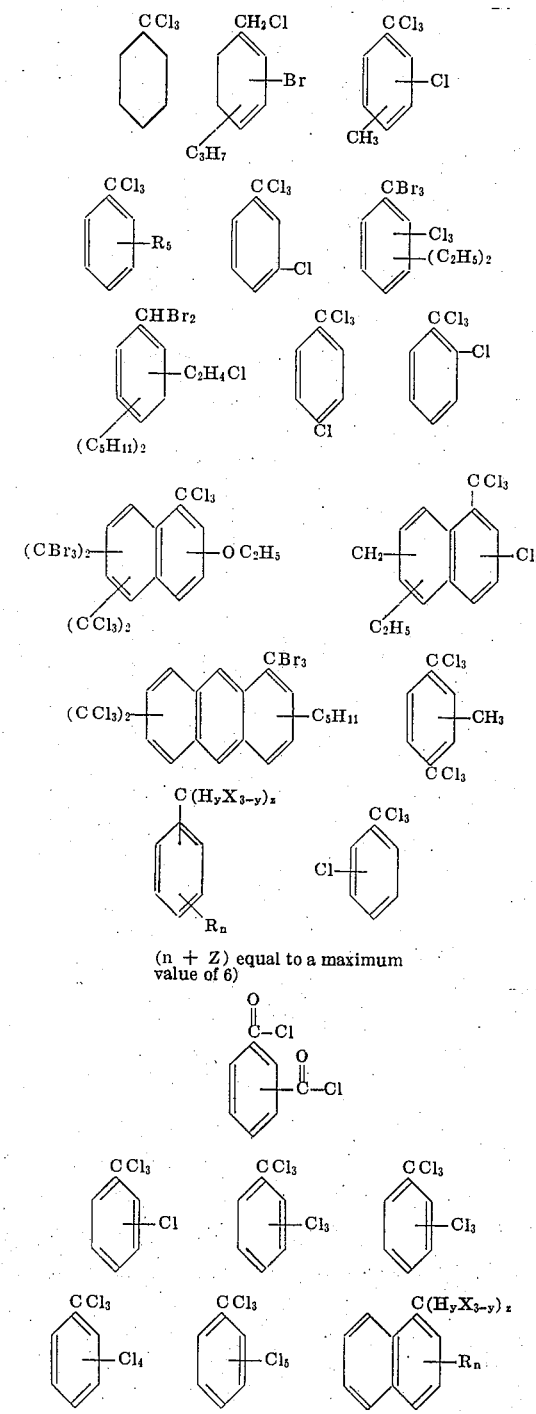

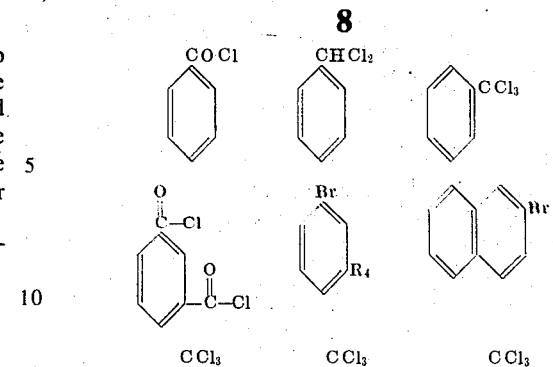

Among the compounds which may be produced in accordance with the novel process of this invention are the following:

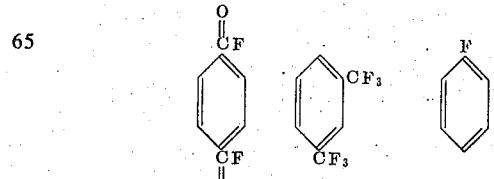

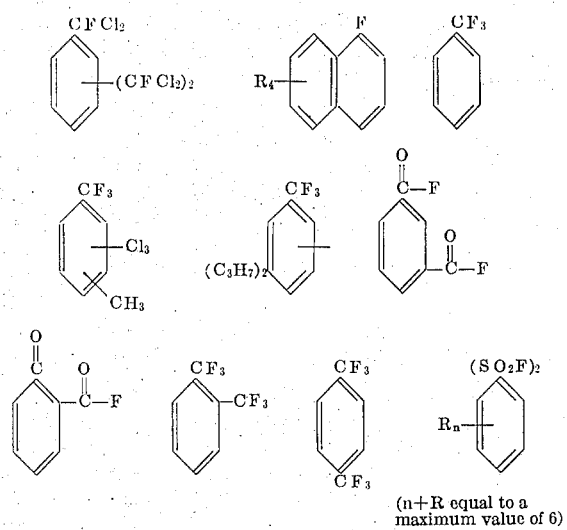

The products of this invention are useful for a variety of purposes and are particularly valuable for use as chemical and dye intermediates, but may also be used as solvents, pharmaceuticals, herbicides, pesticides, and the like. Further, many of the products of this invention are substantially non-corrosive and non-toxic.

The invention will be readily understood with reference to the following examples which are illustrations of certain preferred embodiments of the present invention. Unless otherwise indicated, all temperatures are in degrees centigrade and all parts and percentages used herein are by weight.

EXAMPLE 1

A copper-alumina complex was prepared by reacting 3000 parts by volume of a concentrated solution of sodium aluminate after first diluting the sodium aluminate with water to about 20 times its original volume and slowly mixing the diluted solution with a diluted aqueous solution of 200 parts of copper chloride and sufficient hydrochloric acid to react with the aluminum hydroxide thereby forming a precipitate. The precipitate was filtered, washed with water, and roasted at a temperature of 400 degrees centigrade. The roasted product was then crushed to an average particle size diameter of one quarter inch to one eighth inch. Sufficient product was prepared in this manner to yield 1403 parts of dried product.

The copper-aluminum-fluoride complex was prepared by placing 1403 parts of the prepared granular copper-alumina complex, having an assay of 45.91 weight per cent aluminum, 8.71 weight per cent copper, the remaining constituent being substantially oxygen, into a tubular nickel reactor. The reactor had a length of about 15 times its internal diameter.

The reaction was initiated by heating the copper-alumina precipitated complex to a temperature of 110 degrees centigrade while passing a stream of nitrogen gas through the reactor equal to a per minute volume of about one half of the reactor volume. The initial heating prevented subsequent condensation of water in the reaction bed.

With nitrogen still flowing, 0.7 parts per minute of hydrogen fluoride was metered into the reactor after maintaining the reaction bed temperature in the range of 100 and 110 degrees centigrade for one half hour. The temperature, at the initial contact of hydrogen fluoride and the copper-alumina starting material, immediately increased at the gas inlet end of the bed to about 200 degrees centigrade. The flow of hydrogen fluoride was adjusted to about 1.0 part per minute to control the temperature at the locus of the reaction, in the range of 200 degrees centigrade to 300 degrees centigrade. The flow of nitrogen was such that the nitrogen to hydrogen fluoride dilution ratio was about 2.5 to 1 by volume.

Water was evolved from the reactor and collected by condensing the exit vapors. The locus of the reaction, indicated by the hot zone in the reactor, progressively moved through the bed. The fluorination was terminated when hydrogen fluoride was detected at the exit of the reactor as noted by the reaction of ammonia vapors with hydrogen fluoride. During the reaction, a total of 1670 parts of hydrogen fluoride was used and 715.3 parts of water were condensed from the exit vapors. 2360 parts of fluorinated product were recovered.

The resulting copper-aluminum-fluoride compound had retained the physical shape and strength of the unfluorinated copper-alumina complex. Analysis of the granular product indicated that the resulting composition comprised about 42.3 weight per cent aluminum, 8.02 weight per cent copper and 49.6 weight per cent fluorine.

EXAMPLE 2

Benzotrifluoride was prepared by feeding 1982 parts of benzotrichloride and 816 parts of hydrogen fluoride continuously through flowmeters into a vaporizer-reactor system. The reactor was a tubular structure packed with 1403 parts of the fluorinated copper-alumina complex prepared as in Example 1. Benzotrichloride was metered at a rate of about 7.04 parts per minute in admixture with about 3.05 parts per minute of HF to the vaporizer wherein it was heated to about 250 degrees centigrade. The HF feed rate was 34 per cent above the stoichiometric required to fluorinate the benzotrichloride to benzotrifluoride. From the vaporizer, the heated mixture was passed through the reactor at the indicated rate thereby providing a reactor retention time of 12 to 15 seconds. The reactor temperature was controlled in the range of 225 to 340 degrees centigrade, the average being about 254 degrees centigrade. The effluent gases from the reactor were passed through a condenser which cooled the gases to about -20 degrees centigrade. Over a period of 268 minutes, 1356.4 parts of product were recovered by condensation. The product, after washing with water and caustic soda solution, had a specific gravity at 25 degrees centigrade of 1.180. Analysis by gas chromatography showed the product to be 99 per cent benzotrifluoride; the yield, based on organic feed, was 90 per cent.

EXAMPLE 3

In a manner similar to the procedure of Example 2, 1970 parts of benzotrichloride and 710 parts of hydrogen fluoride were fed into the same vaporizer-reactor system. The reactor contained the same bed of 1403 parts of the catalyst used in Example 2. At the same time this example was run, the catalyst had had over 64 hours of service. The reaction of this example was run at an average temperature of 280 degrees centigrade varying from 245 to 310 degrees centigrade. The reactants were fed at a rate of 7.22 parts per minute of benzotrichloride and 2.57 parts per minute of HF. This feed rate equaled a 17.4 per cent stoichiometric excess of HF. The effluent gases from the reactor were cooled to about -25 degrees centigrade, thereby condensing a liquid product. After washing with water, 1328.3 parts of product, having a specific gravity of 1.181 at 25 degrees were obtained. The product was analyzed by gas chromatography and found to contain 98 per cent benzotrifluoride. The catalyst in the reactor showed no degradation during the reaction period.

EXAMPLE 4

A mixture of 462 parts of parachlorobenzotrichloride and 200 parts of hydrogen fluoride were fed into a vaporizer-reactor system which contained 1487 parts of the copper-aluminum-fluoride prepared in Example 1. The reactor temperature was maintained at an average temperature of 290 degrees centigrade, varying from 235 to 360 degrees centigrade. During a period of 83 minutes, 359.7 parts of product were recovered by low temperature condensation. After washing the condensate with water, 343.8 parts of product were recovered. The product was analyzed by gas chromatography and found to contain 97 per cent para-chlorobenzotrifluoride.

EXAMPLE 5

A cobalt-alumina complex was prepared by reacting 1345 parts of $CoCl_2.6H_2O$ in solution with 557 parts of concentrated hydrochloric acid with 780 parts of finely divided $Al_2O_3$ powder dissolved in 2034 parts of 33 per cent sodium hydroxide. On mixing the liquids at room temperature, a slurry was formed. The slurry was heated to 90 degrees centigrade and then filtered and washed. The filter cake was oven dried and then was roasted at 400 degrees centigrade. The resulting cake was black in color, hard and granular when broken.

Analysis of the product indicated that it was a complex comprising 18 per cent by weight cobalt, 42 per cent by weight aluminum and the remainder being substantially oxygen. This material was used as the starting material for forming the cobalt-aluminum-fluoride catalyst of Example 6.

EXAMPLE 6

The product of EXAMPLE 5 was fluorinated by placing 81 parts of granular material on a mesh support in a tubular reactor having a length equal to 20 times its diameter. The particle size was that which passed through a number of 5 Tyler Standard screen but was retained on a number 7 Tyler Standard screen. Before the fluorination reaction was commenced, air was passed through the reactor at a per minute rate about equal to the volume of the reactor. Hydrogen fluoride, at a rate of 0.4 parts per minute was then added to the air flow. The temperature at the gas inlet end of the granular bed immediately increased to 100 degrees centigrade. The concentration of hydrogen fluoride and the volume of air were then adjusted so that the temperature in the reaction zone did not exceed 400 degrees centigrade. This rate corresponded to an average air to hydrogen fluoride dilution ratio of 3:1 by weight. The hydrogen fluoride flow rate averaged 0.3 parts per minute after adjustment.

During the reaction, the reaction zone progressed from the gas inlet end through the bed toward the gas outlet end. Water, evolved from the reaction zone, was condensed and collected from the effluent gases. When the condensation of water ceased, the reaction was considered to be complete. A total of 37 parts of water was collected during the fluorination.

The fluorinated product was pink in color and analysis indicated that it comprised about 16.5 per cent cobalt, 39 per cent aluminum and 44 per cent fluorine. This product, when substituted for the copper-aluminum-fluoride catalyst in fluorination processes gives corresponding good results.

EXAMPLE 7

Copper-alumina complex, prepared as in EXAMPLE 1, was ground to a particle size which passed through a U.S. Sieve No. 10 and was retained on a U.S. Sieve No. 25. 40.8 parts of this material was added to 1360 parts of benzotrifluoride in a stirred nickel reactor having an exit for volatilized gases. Hydrogen fluoride was bubbled into the mixture, while agitating, at a rate of 60.5 parts per hour for 16.6 hours. During the process, the reactor temperature was maintained between 102 degrees centigrade and 105 degrees centigrade. At one hour intervals, small quantities of benzotrichloride were added to the reaction mixture, the total during the reaction period being 1395 parts. 1321 parts of organic product were condensed from the gases exiting from the reactor.

At the end of the run, the copper-alumina complex was filtered out of the organic liquid remaining in the reactor and analyzed. On analysis, the complex was found to be copper, aluminum, fluorine and chlorine in a weight ratio of 6.2 copper to 19.4 aluminum to 32.3 fluorine to 3.6 chlorine. Although fluorination was incomplete, this complex proved to be an effective fluorination catalyst.

The composite sample of organic condensed from the exit gases, analyzed by gas chromatography and found to be comprised of 66 per cent benzotrifluoride, 24.5 per cent $\alpha,\alpha$-difluoro-$\alpha$-chlorotoluene, 4.7 per cent $\alpha,\alpha$-dichloro-$\alpha$-fluorotoluene and 4.8 per cent $\alpha,\alpha,\alpha$-trichlorotoluene. The reactor contents at the end of the run contained 45.5 per cent benzotrifluoride, 49.0 per cent $\alpha$-chloro-$\alpha,\alpha$-difluorotoluene, 5.5 per cent $\alpha$-fluoro-$\alpha,\alpha$-dichlorotoluene and a trace of benzotrichloride.

EXAMPLE 8

A chromium-alumina complex was prepared by dissolving 142 parts of $CrCl_3.6H_2O$ in 426 parts of 36.7 per cent HCl. This solution was reacted at 100 degrees centigrade with 280 parts of $Al_2O_3.2H_2O$ dissolved in 522 parts of 33 per cent NaOH. The reactants were vigorously agitated and brought to a neutral pH by adjusting with HCl. A thick slurry formed to which water was added in amounts necessary to retain fluidity. The precipitate was filtered and the resulting cake was washed with hot water. The cake was oven-dried at 145 degrees centigrade and subsequently calcined at 340 degrees centigrade for three hours. The complex was olive drab in color and broke easily into fine granular particles. This co-precipitated chromium-alumina complex contained chromium and aluminum in a weight ratio of 7.2:35.3 respectively.

A charge of 1469 parts of p-chlorobenzotrichloride having an index of refraction of $N_D^{24}$ 1.5710 and a specific gravity of 1.4845, was placed in a nickel reactor equipped with an agitator. Also added to the reactor was 146.9 parts of the co-precipitated chromium-alumina complex. HF was then metered into the mixture at a rate such that 0 to 11 per cent of the vent gases was HF, the remainder being substantially HCl. The fluorination of the catalyst and of the organic liquid was carried out in situ at 60 degrees centigrade. After five hours of fluorination, the refractive index of the organic was 1.5305. Fluorination was continued further to a final refractive index of 1.4927 and a specific gravity of 1.3788. Organic product recovered from the reactor was analyzed by gas chromatography and found to contain 11.3 per cent p-chlorobenzotrifluoride, 75.0 per cent p-chloro α,α-difluoro-α-chlorotoluene, 10.8 per cent p-chloro-α-fluoro-α,α-dichlorotoluene and 1.1 per cent p-chlorobenzotrichloride.

The catalyst was removed from the organics by filtration, washed and dried. Analysis of the catalyst showed that it contained chromium, aluminum and fluorine in a weight ratio of 2.7:10.1:25.1, respectively.

EXAMPLE 9

An iron-alumina complex was prepared by dissolving 94.8 parts of $FeCl_3$ in 462 parts of 36.7 per cent HCl. This solution was reacted at 100 degrees centigrade with 280 parts of $Al_2O_3.2H_2O$ dissolved in 522 parts of 33 per cent NaOH. The reactants were vigorously agitated and brought to a neutral pH. The precipitate formed was centrifuged and washed with a hot water spray. The filter cake was oven dried at 145 degrees centigrade and then calcined at 350 degrees centigrade for three hours. The complex obtained was rust in color and in the form of a hard cake. The co-precipitated iron-alumina complex contained iron and aluminum in a weight ratio of 10.5 to 35.0 respectively.

39 parts of the co-precipitated iron-alumina complex was granulated to particles of about 0.2 to 0.03 inches and placed in a vertically positioned tubular reactor heated externally by an electric furnace. The reactor was connected to a similar horizontal unit serving as a preheater and vaporizer. The complex was fluorinated by passing controlled amounts of HF and air into the preheater. The HF rate was 1.39 parts per minute. The initial molar air: HF ratio was 19:1. As the reaction progresses, the dilution ratio was decreased so that finally only HF was used. Water was obtained as a by-product of the reaction and could be condensed from the exit vapors. During fluorination, the maximum bed temperature was 340 degrees centigrade. The fluorination was terminated after two hours. The produce recovered from the reactor was found to be an iron-aluminum-fluoride material. Using the same reactor system, 392 parts of benzotrichloride, having a specific gravity of 1.362 and a refractive index at 25 degrees centigrade of 1.5565 were passed at a rate of 0.91 parts per minute in admixture with HF vapor through the fluorinated complex. The ratio of HF to benzotrichloride was at a rate of 44.6 per cent in excess of stoichiometric. Temperature readings in the reactor bed ranged from 241 degrees centigrade to 362 degrees centigrade. 298 parts of water-white liquid product was recovered by condensing the effluent gases from the reactor. This product had a specific gravity of 1.2529 and a refractive index of $N_D^{24}$ 1.4689. Gas chromatography analyzed the product as: 21.3 per cent benzotrifluoride, 47.0 per cent α-chloro-α,α-difluorotoluene, 25.0 per cent α-fluoro-α,α-dichlorotoluene and 3.8 per cent benzotrichloride.

EXAMPLE 10

A copper-cobalt-aluminum-fluorine complex was prepared in the following manner:

24.5 parts of $CuCl_2.2H_2O$ and 19.8 parts of $CoCl_2.6H_2O$ were dissolved in 213 parts of 37 per cent aqueous HCl.

140 parts of $Al_2O_3.2H_2O$ were dissolved in 261 parts of 33 per cent aqueous NaOH. This solution was slowly added to the acid solution of the cobalt and copper salts. The final pH was adjusted to approximately 7.0 with HCl.

A heavy precipitate formed which was subsequently filtered, washed thoroughly, dried at 110 degrees centigrade and roasted for three hours at 350 degrees centigrade. The roasted product was then broken into granules which passed through a U.S. Sieve No. 4 and were retained on a U.S. Sieve No. 25. 100 parts of granules were placed in a tubular nickel reactor and heated to about 100 degrees centigrade. Hydrogen fluoride, diluted with nitrogen to an average molar ratio of three nitrogen to one HF, was passed into the reactor. The temperature at the point where the HF just contacted the solid particles rose to about 250 degrees centigrade, and the nitrogen flow was increased to prevent the temperature from going higher. When the reaction had progressed all the way through the bed, the preparation was considered complete. During the reaction, water of reaction was detected in the exit gases. By collecting this water the degree of fluorination could be estimated. This material was subsequently successfully used as a catalyst to effect the reaction of HF with benzotrichloride to form benzotrifluoride.

EXAMPLE 11

Forty-nine parts per hour of orthochlorobenzotrichloride (95.5 per cent purity) were fluorinated by the method of this invention by feeding the orthochlorobenzotrichloride and 16 parts per hour of hydrogen fluoride into a reactor which contained 112 parts of the copper-aluminum-fluoride catalyst prepared in Example 1. The reaction temperature was maintained at an average temperature of 333 degrees centigrade, varying between 290 and 390 degrees centigrade. The effluent gases from the reactor were cooled to recover the product by condensation. The recovered product was purified by washing. Analysis by gas chromatography indicated that orthochlorobenzotrifluoride was obtained in 94 per cent yield and 96 per cent purity during more than 24 hours of continuous operation.

EXAMPLE 12

In a manner similar to Example 11, 46.3 parts per hour of parachlorobenzotrichloride and 13 parts per hour of hydrogen fluoride were fed into a reactor which contained 101 parts of catalyst, prepared as in Example 1, at an average temperature of 340 degrees centigrade (280 degrees centigrade to 400 degrees centigrade) for a period of more than 24 hours. Analysis by gas chromatography indicated that parachlorobenzotrifluoride was obtained in a 93.7 per cent yield and 94.4 per cent purity during the period of operation.

EXAMPLES 18 – 22

In a similar manner to Example 2, the following reactions and products were produced under the reaction conditions shown. The work was performed in nickel reactors utilizing the co-precipitated copper-aluminum-fluoride catalyst described in Example 1. The catalyst bed arrangement in the reactors was as follows:

The 4 inch Diameter Reactor had a catalyst bed of 12 inches of coprecipitated copper-aluminum-fluoride prepared as in Example 1;

The 2 inch Diameter Reactor had a catalyst bed of 46 inches of co-precipitated copper-aluminum-fluoride prepared as in Example 1.

0.3% α-fluoro-α,α-dichlorotoluene
Trace benzotrichloride

EXAMPLE 24

LIQUID PHASE FLUORINATION CONTINUOUS OPERATION

Utilizing the same reactor as in Example 23, benzotrichloride was continuously metered into a quantity of benzotrichloride and partially side chain fluorinated benzotrichloride. The same catalyst that was removed

| Example number | Reactants and ratios | Reaction conditions | Major component of product |
|---|---|---|---|
| 18 | (1) Benzoyl chloride (1,765 parts). (2) Catalyst of Example 1, fluorinated (1,500 parts). (3) Hydrogen fluoride, 253 parts/minute. (4) Mole ratio of hydrogen fluoride to benzoylchloride, 3.74. | (1) Temperature of reactor, 365° C. (2) Retention time, 13 seconds. | Benzoyl fluoride. |
| 19 | (1) Benzal chloride (1,695 parts). (2) Same catalyst charge as Example 18. (3) Hydrogen fluoride, 1.80 parts/minute. (4) Mole ratio of hydrogen fluoride to benzal chloride=2.91. | (1) Temperature of reactor, 343° C. (2) Retention time, 18 seconds. | Benzal fluoride. |
| 20 | (1) Bromobenzene, 948 parts. (2) Catalyst of Example 1, 1,638 parts. (3) Hydrogen fluororide, 2.18 parts/minute. (4) Mole ratio of hydrogen fluoride to bromobenzene=1.8. | (1) Temperature of reactor, 359° C. (2) Retention time, 12 seconds. | Fluorobenzene. |
| 21 | (1) Terephthaloyl chloride in benzene, 586 parts. (2) Catalyst of Example 1. (3) Hydrogen fluoride, 1.80 parts/minute. (4) Mole ratio of hydrogen fluoride to terephthaloyl chloride, 4.1. | (1) Temperature of reactor, 345° C. (2) Retention time, 12 seconds. | Terephthaloyl fluoride. |
| 22 | (1) Octachlorocyclopentene, 2,200 parts. (2) Catalyst of Example 1, 1,403 parts. (3) Hydrogen fluoride, 2.23 parts/minute. | (1) Temperature of reactor, 300° C. (2) Retention time, 13-16 seconds. | 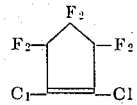 Dichlorohexafluorocyclopentene. |

NOTE: The processes of Examples 20, 21, and 22 were accomplished in a two-inch diameter reactor, while the processes of Examples 18 and 19 were accomplished in a four-inch reactor.

In a similar manner it is also possible to prepare α,α-difluoro-α-chloro toluene from α-fluoro-α,α-dichlorotoluene by modifying the procedure of Examples 18 – 22 with respect to temperatures, ratios of reactants, retention times, and the like.

EXAMPLE 23

LIQUID PHASE FLUORINATION-BATCH OPERATION

Into a nickel reactor provided with a reflux condenser and an agitator, the following reactants were added in the proportions indicated.

1. 1223 parts of distilled benzotrichloride.
2. 186 parts of the catalyst of Example 1, crushed so as to pass through a U.S. Standard Sieve No. 20.
3. 935 parts of hydrogen fluoride. The flow of hydrogen fluoride was continuous during the reaction.

The reaction was effected at a temperature of 75 degrees centigrade to 80 degrees centigrade for a period of 8.27 hours.

At the beginning of reaction, the exit gases analyzed by gas chromatography as follows:
  Hydrogen Fluoride 32%
  Hydrogen Chloride 68%

While on the completion of the reaction, the exit gases analyzed:
  Hydrogen Fluoride 97%
  Hydrogen Chloride 3%

After 8.27 hours of fluorination, the organic product in the reactor analyzed as follows:
  Specific gravity 1.212 (25°C)
Composition by gas chromatography:
  37% benzotrifluoride
  62% α,α-difluoro-α-chlorotoluene

EXAMPLE 24

LIQUID PHASE FLUORINATION CONTINUOUS OPERATION

Utilizing the same reactor as in Example 23, benzotrichloride was continuously metered into a quantity of benzotrichloride and partially side chain fluorinated benzotrichloride. The same catalyst that was removed by filtration from Example 23 was re-used. The heel in the reactor was maintained approximately at a constant level. The following conditions were employed:
  Organic feed, rate 4.17 parts/minute
  Hydrogen Fluoride, rate 2.04 parts/minute
  Reaction temperature 100°C – 112°C The exit reactor vapors were passed through a condenser. During a 406 minute period, 1561 grams of product were collected and analyzed by gas chromatography as follows:
  Specific gravity of product: 1.212 (25°C)
Composition of condensed product:
  46% benzotrifluoride
  46.6% α,α-difluoro-α-chlorotoluene
  5.7% α-fluoro-α,α-dichlorotoluene
Noncondensed gases analyzed:
  23% Hydrogen Fluoride
  77% Hydrogen Chloride While the invention has been set forth in relation to the specific examples above, it should be realized that the invention in its broadest aspects is not so limited. Other modifications thereof will become apparent to one skilled in the art upon reading of this disclosure. Such modifications are considered to be within the scope of this invention.

EXAMPLE 25

CONTINUOUS PRODUCTION OF P-CHLORO BENZOTRIFLUORIDE

Into a liquid phase reactor was continuously fed 12.0 lbs/hr of para-chloro benzotrichloride, as well as 5.29 lbs/hr of gaseous HF and HCl, the off-gas from a catalytic vapor phase reactor. The HF content in this gas was 31 mole percent, i.e., 1.05 lbs/hr. After fluorination, at atmospheric pressure and 40-45 degrees centigrade, at the rate of about 12:1 organic to HF, in the presence of 5 percent by weight-20 mesh perfluorinated catalyst made according to Example 1, analysis of the product leaving the liquid phase reactor is as listed below:

| COMPONENT (MOL %) | % |
|---|---|
| low boilers | 0.2 |
| p-chloro benzotrifluoride | 16.5 |
| p-chloro,α,α-difluoro-α-chlorotoluene | 16.4 |
| p-chloro,α,α-dichloro-α-fluorotoluene | 22.3 |
| p-chloro-benzotrichloride | 43.5 |
| high boilers | 0.4 |

As can be seen the percent Cl replaced by F (in the methyl group) is about 34 percent. Titrametric analysis of the off-gas, from the liquid phase fluorinator, gave 0 percent HF. The off-gas was therefore all HCl, thus indicating complete utilization of the HF.

After the liquid phase reaction the organic product is heated to the vapor state and introduced into a vapor phase reactor filled with 2000 mls of the same but unground prefluorinated catalyst maintained at an average bed temperature of 340-350 degrees centigrade at atmospheric pressure. Gaseous heated (202°C) HF is introduced at the mole ratio of about 3:1, HF: organic material. A total of 2,570 grams of organic was fed to the reactor, the average retention time being about 5 seconds. The catalyst used in the vapor phase was made according to Example 1. Complete fluorination (over 98%) of the organic feed was realized, 96.4 percent being to the tri-fluoromethyl group.

The off-gases from the vapor phase reaction are about ⅓ HF and ⅔ HCl. These gases can be then recycled to the liquid phase reactor. Also prior to introduction into the reactor the HCl could also be removed. This scheme demonstrates that by the combination of liquid and vapor phase reactions complete utilization of HF can be realized.

EXAMPLE 26

CONTINUOUS PRODUCTION OF P-CHLORO BENZOTRIFLUORIDE

Into a liquor phase reactor (2.94 ft³) was continually fed 12.0 lbs/hr para-chloro benzotrichloride as well as 7.4 lbs/hr of gaseous HF and HCl, the off gas from a catallytic vapor phase reactor. The HF content was 20.5 mole percent. The organic was fluorinated at atmospheric pressure and about 45 degrees centigrade, at a nearly constant volume by means of an overflow system. The catalyst was 5 percent by weight −20 mesh perfluorinated catalyst made according to Example 1. Analysis of the product leaving the liquid phase reaction is as listed below:

| COMPONENT (MOL %) | % |
|---|---|
| low boilers | 0.3 |
| p-chloro benzotrifluoride | 19.9 |
| p-chloro,α,α-difluoro-α-chlorotoluene | 7.4 |
| p-chloro,α,α-dichloro-α-fluorotoluene | 6.0 |
| p-chloro-benzotrichloride | 64.7 |
| high boilers | 0.8 |

As can be seen the percent Cl replaced by F (in the methyl group) is about 30.2 percent. Titrametrical analysis of the off-gas, from the liquid phase fluorinator gave 0.8 percent HF, the off-gas was therefore over 99 percent HCl, indicating substantially complete utilization of the HF.

After the liquid phase reaction the organic product is heated to the vapor state and introduced into a vapor phase reaction filled with 2000 mls of the same, but unground perfluorinated catalyst maintained at an average bed temperature of 290-385 degrees centigrade at atmospheric pressure. Gaseous heated (208°C) HF is introduced at a mole ratio of about 3.3:1.0, HF: organic material with a reaction time of about 11 seconds. The total feed of organic material was 1,312 grams. The catalyst used in the vapor phase was made according to Example 1. 1037 grams of product was collected which when analyzed by gas chromatography showed that 98 percent of the chlorine in the methyl groups was fluorinated, 97.1 percent being to the tri-fluoromethol group.

EXAMPLE 27

In a manner similar to the liquid phase process of Example 25 a product was produced having the following analysis:

| COMPONENT (MOL %) | % |
|---|---|
| low boilers | Trace |
| p-chloro benzotrifluoride | 15.0 |
| o-chloro benzotrifluoride | .3 |
| p-chloro,α,α-difluoro-α-chlorotoluene | 15.5 |
| p-chloro,α-fluoro,α,α-dichlorotoluene | 9.2 |
| p-chloro benzotrichloride | 58.4 |
| o-chloro-benzotrichloride | 0.6 |
| high boilers | 0.3+ |

The above product was heated to the vapor state and introduced into a vapor phase reactor filled with 2000 mls of the same but unground prefluorinated catalyst maintained at an average bed temperature of 305-390 degrees centigrade at atmospheric pressure. Gaseous heated (192°C) HF is introduced at the mole ratio of about 3.8:1, HF: organic material. The total feed of organic material was 1580 grams and the retention time was 8 seconds. The catalyst used in the vapor phase was prepared according to Example 1. 1211 grams of product was collected which when analyzed by gas chromatography showed that 98.5 percent of the chlorine in the methyl group was fluorinated, 96.6 percent being to the trifluoromethyl group.

I claim:
1. A process for the production of compounds of the formula

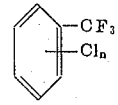

which comprises
1. contacting in liquid phase and, at a temperature from about 0° centigrade to reflux, HCl and HF with ] compound of the formula

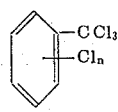

wherein n is from 0 to 5 inclusive, in a molar ratio of HF to organic of from about 0.1:1 to about 3.0:1 for a time sufficient for substantially complete utilization of the HF;

2. feeding the aromatic product of step (1) to a second reactor; and
3. contacting in vapor phase, at a temperature from about 200° to about 500° centigrade and in a mole ratio from about stoichiometric to about 6.0:1, HF with the product of step (2);
   wherein steps (1) and (3) are performed in the presence of a coprecipitated metal-aluminum-fluorine catalyst which is characterized as a granular, porous material of high surface area and high structural strength, containing 30 to 60 weight percent of aluminum, 25 to 55 weight percent of fluorine and 0.5 to 35 weight percent of a metal selected from the group consisting of Group IB, IIB, VIB, and VIII of the Periodic Table of Elements, and which is prepared by coprecipitating a metal-alumina composition, from an alkaline solution of alumina, by acidification thereof in the presence of a metal chloride, said metal being selected from the group consisting of Group IB, IIB, VIB and VIII of the Periodic Table of Elements, filtering, washing and drying the coprecipitate, and subsequently fluorinating, at a temperature from about 0° to about 600° centigrade with HF in the presence of an inert diluent gas, until the reaction is completed as indicated by cessation of water evolution.

2. The process of claim 1 wherein the reactant is

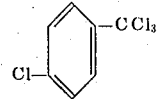

3. The process of claim 1 wherein the catalyst is a copper-aluminum fluoride complex.

4. The process of claim 1 wherein the catalyst is a copper-cobalt-aluminum-fluoride complex.

5. The process of claim 1 wherein the catalyst is a chromium-aluminum-fluoride complex.

6. The process of claim 1 wherein the catalyst is a cobalt-aluminum-fluoride complex.

7. The process of claim 1 wherein the reactant is

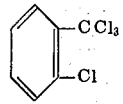

* * * * *

PO-1050
(5/69)

UNITED STATES PATENT OFFICE
CERTIFICATE OF CORRECTION

Patent No. 3,859,372                    Dated    January 7, 1975

Inventor(s)           Stephen Robota

It is certified that error appears in the above-identified patent and that said Letters Patent are hereby corrected as shown below:

Column 1, line 68, "n-Z" should read --n+Z--. Column 3, line 34, "in two steps:" should read --in three steps--; line 68, "6.0:1.0; Hf" should read --6.0:1.0; HF--. Column 7, line 55, that part of the formula reading                       should read

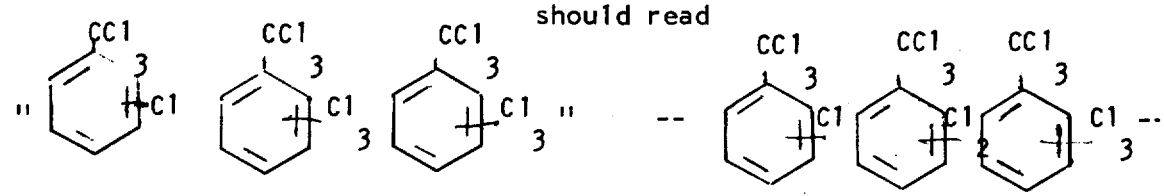

Colomn 9, line 10, that part of the formula reading

   should read --

Column 13, line 49, "The produce recovered" should read --The product recovered--.

Signed and sealed this 1st day of April 1975.

(SEAL)
Attest:

RUTH C. MASON
Attesting Officer

C. MARSHALL DANN
Commissioner of Patents
and Trademarks